United States Patent [19]
Grant et al.

[11] 3,882,233
[45] May 6, 1975

[54] METHODS OF INCREASING PRODUCTION OF PITUITARY HORMONES

[75] Inventors: Norman H. Grant, Wynnewood; Ruth S. Rappaport, Strafford, both of Pa.

[73] Assignee: American Home Products Corporation, New York, N.Y.

[22] Filed: July 27, 1973

[21] Appl. No.: 383,414

[52] U.S. Cl. .................. 424/177; 195/1.8; 424/108
[51] Int. Cl....A61K 17/08; C12D 5/00; C12D 13/06
[58] Field of Search ............... 195/1.7, 1.8; 424/177

[56] References Cited
UNITED STATES PATENTS
3,073,746   1/1963   Thompson et al.................. 195/1.8

OTHER PUBLICATIONS
Jacoby et al., Chem. Abst., Vol. 76, (1972), page 135868d.

Schafer et al., Chem. Abst. Abst., Vol. 76, (1972), page 108925p.

Kimberg et al., Chem. Abst. Abst., Vol. 79, (1973), page 38589t.

Fukaya et al., Chem. Abst., Vol. 79, (1973), page 38495j.

*Primary Examiner*—Sam Rosen

[57] ABSTRACT

A method for increasing the production of pituitary hormones, including particularly growth hormone, is described which comprises contacting a culture of pituitary cells with an effective amount of cholera enterotoxin.

9 Claims, No Drawings

METHODS OF INCREASING PRODUCTION OF PITUITARY HORMONES

This invention relates to a method of stimulating the production of pituitary hormones, using enterotoxin.

Growth hormone (GH), also known as somatotropin, is a protein anabolic hormone (i.e. one which promotes synthesis of body proteins). It does this by retarding the breakdown and loss of amino acids, which are the components of all proteins. Growth hormone also promotes the conservation of carbohydrate stores, for example, the high levels of glycogen stored in the heart. In addition, it stimulates the production of milk (i.e. is lactogenic) and it enhances the effectiveness of several other hormones (corticotropin, thyrotropin, and gonadotrophin), without performing their function alone.

Prolactin (PRL) is the most versatile of the pituitary hormones, although all of its effects have not been studied in all the animals of interest, including man. Well established, broadly distributed functions do include stimulation of mammary gland development, induction of milk production, and stimulation of growth.

Luteinizing hormone (LH) promotes the secretion of estrogen by ovarian follicles and causes ovulation. In males luteinizing hormone activates the production of testicular androgen.

The hormones of the pituitary gland exert important controls over metabolism, growth, reproduction, and behavior. The hormones of the hypothalamus act as modulators or "fine tuners" of the pituitary effects by controlling the secretion of the pituitary hormones themselves. The two groups of hormones together with those secreted by target glands such as the thyroid, gonads and adrenal cortex, comprise an intricate neurochemical circuit, the reverberations of which determine the efficiency and smoothness of adaptive changes.

The hypothalamic hormones are exceedingly potent, acting in the range of nanograms ($10^{-9}$ g) per animal. However, the gland itself is very small, and its content of any given hormone is very small. One practical difficulty is that millions of sheep or pig glands are required for isolation of milligram quantities of luteinizing hormone releasing factor (LRF) and thyrotropin hormone releasing factor (TRF).

The mere existence of any hypothalamic releasing factor for growth hormone is clouded in doubt, and the question has been rendered more difficult to answer by the existence of a potent hypothalamic inhibitor of growth hormone release.

In accordance with the present invention it has been found that cholera enterotoxin is useful for stimulating the secretion of growth hormone (somatotrophin hormone), luteinizing hormone, prolactin and thyrotropin, all of which are recognized as hormones secreted by the pituitary gland.

Cholera enterotoxin (CE) is an extracellular protein with a molecular weight of 84,000 daltons which is elaborated by certain strains of *Vibrio cholerae*, most notably Inaba 569B. The availability of such strains together with growth conditions under which they secrete significant quantities of enterotoxin in broth culture has made possible its isolation and characterization. The production and purification of cholera enterotoxin has been described by Finklestein et al, J. Exp. Med. 130 pp 185-202 (1969) and summarized by Pierce et al. Bacteriol Reviews, 35, No. 1 pp 1-13 (March 1971). The disclosure of these articles is incorporated herein by reference.

It has been found that purified cholera enterotoxin at concentrations of $6 \times 10^{-8}$M to $6 \times 10^{-9}$M stimulated the secretion of luteinizing hormone, growth hormone, prolactin and thyrotropin by cultured pituitary cells. Growth hormone secretion was obtained with cholera enterotoxin concentration as low as $1.2 \times 10^{-14}$M and stimulation of prolactin secretion was observed at a concentration of cholera enterotoxin as low as $1 \times 10^{-13}$M. The level of pituitary hormones released by cholera enterotoxin - stimulated pituitary cells, is at least equal to the levels of hormone release achieved using natural or synthetic hypothalamic releasing factors used at higher concentrations.

The source of pituitary cells used in the present invention is the pituitary organ in any animal. The whole pituitary organ or the anterior portion thereof may be employed in the method of the present invention by treatment of the excised organ (or part thereof) with cholera enterotoxin in a suitable culture medium. Alternatively, cell cultures which are obtained from the pituitary gland may be used as suspension cultures (i.e. individual pituitary cells which actively divide suspended in a culture medium) and contacted with an effective amount of cholera enterotoxin. A further choice is to use monolayer pituitary cell cultures which can be propagated continuously, such as the rat pituitary tumor line - $GH_3$. Techniques for culturing pituitary cells have been described in the literature such as by Vale et al, Endocrinology 91 pp 562-572 (1972); Grant et al. Biochem, Biophys. Res. Commun. 51 pp 100-106 (1973).

The pituitary hormones released by cholera enterotoxin - stimulated cultured pituitary cells can be separated from the enterotoxin and the cultured pituitary cell system so as to recover uncontaminated pituitary hormones which may be used for therapeutic purposes as have been described in the literature such as by Schalley et al, Science, 179 pp 346-347 (1973); and Fabris et al, Nature, 240 pp 557-550 (1972).

While the preferred use of enterotoxin is through in vitro methods as described supra, this material also has in vivo application in mammals. For example, rat plasma levels of growth hormone are elevated after subcutaneous administration of cholera enterotoxin and the administration of the cholera enterotoxin at low concentration did not have an adverse effect on the rats. Thus, the present invention has application in the veterinary field where it can be used to increase the levels of growth hormone, which can also be recovered from the plasma. The recovered growth hormone can be used to treat conditions associated with a growth hormone deficiency in mammals of the same class from which the growth hormone is obtained.

EXAMPLE 1

The cultured pituitary cells are prepared as follows: Sixty rat pituitary glands are removed under aseptic conditions and placed in large petri dishes containing Hanks Balanced Salt Solution (HBSS), which also contains 200 μg penicillin G and 200 μg streptomycin. The glands are removed to a small beaker with forceps, minced with scissors, washed 3 times with HBSS, and transferred to a "trypsinizing flask" containing a stirring bar. Then there is added 30 ml of an enzyme solution (3% bovine serum albumin, 0.1% hyaluronidase, 0.35% collagenase in "HEPES" buffer) and the flask is transferred to a 37°C incubator. The tissue is digested until no clumps are visible (1–1.5 hrs). The flask is removed and the cell suspension is transferred to a centrifuge tube and let stand at room temperature 10–15 min. until it settles. The supernatant fluid is removed gently by decanting and 30 ml of 0.25% pancreatin in HEPES buffer is added and transferred to the trypsinizing flask and digested again for about 30 minutes at 37°C. All the suspension is transferred into a centrifuge tube, centrifuged at 2000 RPM (GEC International centrifuge) for 10 min. and the supernatant fluid is decanted. The cells are washed 3 times with HBSS and the volume is brought to about 55 ml. The cells are counted under a microscope; two sizes appear: about $0.22 \times 10^6$ large cells and $1.16 \times 10^6$ small cells. One ml of cell suspension plus 8 ml growth medium are seeded in each small plastic petri dish (60 × 15 mm) and placed in an incubator (5% $CO_2$, 95% air) at 37°C. Five days later the medium is changed. On day six, prior to assay, the cells in the petri dish are washed with HBSS without calf serum, bicarbonate, or antibiotics.

For the experimental run, each plate is incubated with 5 ml of Earle's Balanced Salt Solution. The control systems (3 dishes) contain only cells plus 5 ml of Earle's Balanced Salt Solution while the experimental systems (2 or 3 dishes per variation) contain cholera enterotoxin obtained from the enterotoxin-producing strain *Vibrio cholerae* Inaba 569B, dissolved in 5 ml of Earle's Balanced Salt Solution. After incubation for 3 hours supernatant solutions are removed by pipette and assayed for hormone content by radioimmunoassay.

The identification of the reagents HBSS, HEPES, Earle's Balanced Salt Solution and the growth medium is as follows, with all concentrations being g/l except where otherwise indicated.

| | |
|---|---|
| HBSS: | NaCl, 8.0; KCl, 0.4; $CaCl_2$, 0.14; $MgSO_4.7H_2O$, 0.2; $Na_2HPO_4.7H_2O$, 0.1; $KH_2PO_4$, 0.06; $NaHCO_3$, 0.350; glucose, 1.0. |
| HEPES: | NaCl, 8.0; KCl, 0.38; $Na_2HPO_4$, 0.1; N-2-hydroxyethylpiperazine-N-2-ethanesulfonic acid, 6.0 (to pH 7.4 with NaOH); glucose, 1.0; 50 mg each ampicillin, streptomycin. |
| Growth Medium: | 100 ml 10 X concentrated HBSS; 900 ml $H_2O$; 100 ml fetal calf serum; 10 ml 100 X concentrated penicillin G/streptomycin (i.e., 10 ml of a solution containing 10 g/l of each); 10 ml of 7.5% $NaHCO_3$. |
| Earle's Balanced Salt Solution | NaCl, 6.8; $NaHCO_3$, 2.0; $NaH_2PO_4.H_2O$, 0.15; KCl, 0.4; $CaCl_2$, 0.2 $MgCl_2.6H_2O$, 0.2; glucose, 1.0; ampicillin, 50 mg; streptomycin sulfate, 50 mg. (Adjust to pH 7.4 with 4N HCl). |

The radioimmunoassays for the presence of growth hormone, prolactin, luteinizing hormone and thyroid stimulating hormone which are carried out in accordance with the procedure described by Berson et al., Metabolism, 13, p 1135 (1964), at varying concentrations of cholera enterotoxin in the procedure of Example 1 gave the following results: Secretion of growth hormone was stimulated by a concentration of cholera enterotoxin ranging from $6\times10^{-8}$M through $1\times10^{-14}$M of cholera enterotoxin, the preferred minimum concentration of cholera enterotoxin being about $1\times10^{-11}$M. Stimulation of prolactin was observed at a cholera enterotoxin concentration ranging from $6\times10^{-8}$M through $1\times10^{-13}$M and stimulation of luteinizing hormone and thyroid stimulating hormone was obtained at a cholera enterotoxin concentration ranging from $6\times15^{-8}$M to $6\times10^{-9}$M.

EXAMPLE 2

Monolayer pituitary cells prepared as described in Example 1 were treated with 1 ng/ml of cholera enterotoxin for 3 hours at 37°C. Growth hormone output increased from 82 ng/ml in the control to 436 ng/ml in the test system. Four days later, the culture fluids from duplicate petri dishes were assayed for toxin employing the rabbit skin permeability assay, described by Craig, Nature (London), 207:614–616 (1965). This test can detect as little as 0.1 ng of toxin. No toxin was detected in the supernatant fluids. This means that 90% or more of toxin added to the cells (1 ng was added) was either bound to the cells or was detoxified as a result of interacting with the cells or on standing. If the former is the case, than there whould be little or no toxin in fluids containing growth hormone. If the latter is the case, residual detoxified toxin is easily removed by suitable chromatographic techniques, for example, gel filtration on Sephadex or Bio-Gel columns: large molecules, such as toxin (MW, 86,000) pass through well ahead of smaller proteins, such as growth hormone (MW, 22,000).

EXAMPLE 3

The in vivo use of cholera enterotoxin to increase secretion of pituitary hormones is carried out as follows: In a vehicle composed of 0.067 M $KH_2PO_4$-Na2$HPO_4$ (pH 7.4) and 0.1% gelatin is dissolved sufficient cholera enterotoxin to give the desired dosage in 0.5 ml. The enterotoxin solution is injected subcutaneously into one group of rats and a second group of control rats receive the vehicle without cholera enterotoxin. Each of the rats is bled 15 minutes after injection, with at least 0.5 ml of plasma being removed from each rat.

Stimulation of growth hormone and prolactin secretion were observed at a concentration of 10 ng cholera enterotoxin using the radioimmunoassay procedure previously referred to.

What is claimed is:

1. A method of stimulating the in vitro secretion of at least one pituitary hormone selected from the class consisting of growth hormone, prolactin, luteinizing hormone and thyrotropin which comprises contacting cultured pituitary cells with an effective concentration of cholera enterotoxin.

2. A method according to claim 1 wherein the minimum cholera enterotoxin concentration is about $1.2\times10^{-14}$M.

3. A method according to claim 2 which includes the further step of separating and removing said secreted pituitary hormone from said cholera enterotoxin and said cultured pituitary cells.

4. A method according to claim 1 wherein said pituitary hormone is prolactin.

5. A method according to claim 1 wherein said pituitary hormone is luteinizing hormone.

6. A method according to claim 1 wherein said pituitary hormone is thyrotropin.

7. A method of stimulating the in vitro secretion of growth hormone which comprises introducing into cultured pituitary cells cholera enterotoxin at a concentration no less than $1.2\times10^{-14}$M.

8. A method according to claim 7 wherein said concentration of said cholera enterotoxin is no less than $1 \times 10^{-11}$M.

9. A method of increasing the secretion of and recovering a pituitary hormone selected from the class consisting of growth hormone and prolactin which comprises administering by injection to a mammal an effective amount of cholera enterotoxin and then recovering said hormone from the blood plasma of the mammal.

* * * * *